(12) United States Patent
Würstlin

(10) Patent No.: US 7,377,770 B2
(45) Date of Patent: May 27, 2008

(54) INJECTION MOLDING TOOL

(75) Inventor: Gerd Würstlin, Bahlingen (DE)

(73) Assignee: Männer Innovation GmbH, Bahlingen (DE)

( * ) Notice: Subject to any disclaimer, the term of this patent is extended or adjusted under 35 U.S.C. 154(b) by 265 days.

(21) Appl. No.: 11/254,504

(22) Filed: Oct. 20, 2005

(65) Prior Publication Data

US 2006/0099296 A1    May 11, 2006

(30) Foreign Application Priority Data

Nov. 11, 2004 (NL) ........................ 10 2004 054 464

(51) Int. Cl.
*B29C 45/18* (2006.01)

(52) U.S. Cl. ...................... 425/564; 425/572

(58) Field of Classification Search ................ 425/564, 425/572
See application file for complete search history.

(56) References Cited

U.S. PATENT DOCUMENTS

| 5,460,510 | A | 10/1995 | Gellert | |
|---|---|---|---|---|
| 6,200,126 | B1 | 3/2001 | Lohl | |
| 6,575,731 | B1 * | 6/2003 | Olaru et al. | 425/564 |
| 2004/0191357 | A1 | 9/2004 | Babin | |

FOREIGN PATENT DOCUMENTS

| DE | 198 01 412 | 7/1999 |
|---|---|---|
| JP | 63 231917 | 9/1988 |
| JP | 03/247423 | 11/1991 |
| JP | 2000 025077 | 1/2000 |

OTHER PUBLICATIONS

Bauscshe, G. et al. "Heisskanal Technik in Etagenwerkaeugen Hot Runner Technology in Multi-Daylight Moulds", *Kunstoffe*, Carl Hanser Verlag, Munchen, vol. 85, No. 6, Jun. 1, 1995.
Bauscshe, G. et al. "Heisskanal Technik in Etagenwerkaeugen Hot Runner Technology in Multi-Daylight Moulds", *Kunstoffe*, Carl Hanser Verlag, Munchen, vol. 85, No. 6, Jun. 1, 1995.

* cited by examiner

*Primary Examiner*—Tim Heitbrink
(74) *Attorney, Agent, or Firm*—Klaus J. Bach

(57) ABSTRACT

In an injection molding tool including at least one hot channel nozzle to which a melt is supplied via a hot channel structure which at its end remote from the hot channel nozzle includes an inlet opening which can be closed by a closure element which is axially movably supported in the inlet part of the hot channel adjacent the inlet opening, the hot channel is angled and the closure element extends in sealed relationship through an angled wall area of the hot channel structure for actuating the closure member, the inlet area and an operating device for actuating the closure member being disposed in a separate unit removably connected to the injection molding tool.

5 Claims, 2 Drawing Sheets

INJECTION MOLDING TOOL

BACKGROUND OF THE INVENTION

The invention relates to an injection molding tool including at least one hot channel nozzle to which melt is supplied via a hot channel which, at its end remote from the hot channel nozzle, includes an inlet opening which can be closed by a closure element which extends axially through an inlet part of the hot channel adjacent the supply opening wherein, at its end remote from the inlet opening, the hot channel is angled and the closure element extends through the wall of the hot channel for actuation of the closure element by an operating element disposed outside the hot channel.

Such an injection molding tool is well-known in the state of the art and is manufactured and sold for example by the Assignee of the present application with great success. However, in the known injection molding tool, the melt is always conducted from an injection molding machine arranged at the side of the injection molding tool via an admission opening into an inlet part of a hot channel which extends into the interior of the injection molding tool. At its end remote from the inlet opening the inlet part of the hot channel is angled. By means of the hot channel structure, the melt is distributed to the respective hot channel nozzles.

For the transfer of the melt, the supply nozzle of the injection molding machine is placed in tight contact with the input part of the hot channel. Since the supply nozzle has to be removed from the injection molding tool during operation, for example, during the removal of the manufactured injection molding parts from the injection molding tool, the supply nozzle is not disposed on the inlet opening for a certain period so that melt can flow out of the supply nozzle because of a backflow of melt.

Melt flowing out of the nozzle however can result in large manufacturing problems. It is therefore advantageous if also the supply opening can be closed by a closure member like the outlet opening of the hot channel nozzle. The closure member is for example a valve needle which extends about axially through the inlet part of the hot channel and protrudes through the angled wall of the inlet part of the hot channel. At the end of the closure needle, which projects from the hot channel, an operating device is provided which comprises generally a pneumatic or hydraulic operating cylinder. Because of the high pressure prevalent in the hot channel the seals at the penetration area of the valve needle through the wall must comply with high sealing requirements. Leakages could result in a breakdown of manufacturing operations.

Since the inlet part of the hot channel extends into the interior of the injection molding tool, the place where the closure needle extends through the wall of the hot channel and the operating element are disposed in the interior of the injection molding tool. This is highly disadvantageous since, consequently, the penetration seals and the operating device are not easily accessible from the outside. As a result, maintenance or repair work for eliminating a defect by an exchange of faulty components is generally only possible upon disassembly of the injection molding tool. This however results often in undesirably long downtimes of the injection molding tool for servicing or repair work. Furthermore, the known arrangement is of a relatively complicated design.

It is therefore the object of the present invention to provide an injection molding tool of the type as described above, wherein however servicing and/or repair of the closure elements for the melt admission opening are facilitated.

SUMMARY OF THE INVENTION

In an injection molding tool including at least one hot channel nozzle to which a melt is supplied via a hot channel structure which at its end remote from the hot channel nozzle includes an inlet opening which can be closed by a closure element which is axially movably supported in the inlet part of the hot channel adjacent the inlet opening, the hot channel is angled and the closure element extends in sealed relationship through an angled wall area of the hot channel structure for actuating the closure member, the inlet area and an operating device for actuating the closure member being disposed in a separate unit removably connected to the injection molding tool.

Since the inlet part of the hot channel is disposed completely within the tool half adjacent the supply opening, the seals for the penetration of the closure needle through the wall of the hot channel and for the operating element of the closure needle are accessible from the outside. As a result, disassembly of the injection molding device, during servicing or repair work of the injection molding tool is superfluous and downtimes of the injection tool during servicing or repair of the closure element for the admission opening are reduced.

If the input part of the hot channel structure is in the area of the outer wall of the injection molding tool the operating element can be arranged in a recess in the injection molding tool so that it too is accessible from the outside. Then the operating element and the penetration seals of the closure needle in the wall of the hot channel structure, that is all the sensitive parts, are accessible from the outside. It is advantageous if the inlet part of the hot channel structure is disposed in a separate unit which is removably mounted to the injection molding tool. Preferably also the operating element for the closure element is arranged in this separate unit as it is provided in a particular embodiment of the invention.

In connection with servicing and/or repair work the separate unit can be easily and rapidly exchanged whereby downtimes are substantially eliminated. The necessary servicing or repair work can then be performed on the removed unit while operation of the injection molding apparatus can be continued with an exchange unit.

Since the supply opening of the hot channel is always provided with a so-called sprue bushing which is removably connected to the injection molding tool the separate unit is preferably so designed that it is mounted to the injection molding tool in the same mounting plane as the sprue bushing. In this way, the separate unit can be easily and reliably connected to the injection molding tool.

If as provided in another embodiment of the invention, the angled end of the inlet part of the hot channel structure is provided with a component with an end which is angled with respect to the inlet part, the hot channel structure has a Z-shaped front part. This means that the inlet opening of the hot channel structure is only displaced sidewardly with respect to a conventional arrangement. In this way, with the arrangement of the injection tool according to the invention, the arrangement comprising the injection molding tool and the injection molding apparatus is not substantially changed. Only the position of the nozzle of the injection molding apparatus must be slightly changed. Furthermore, the position of the injection molding apparatus nozzle can be adapted in this way to the injection molding tool. Particularly the distance between the respective center axis of the machine nozzles of the injection molding apparatus and the hot channel structure of the injection molding tool can be adapted to one another. Furthermore, a needed space between the center axis of the machine nozzle of the injection molding machine and the tool mounting plate can be easily be established.

In another embodiment of the invention, the separate unit includes a heating element whereby the melt in the separate unit can be heated.

The separate unit may also include a temperature sensor so that the temperature sensor and the heating element can be easily removed together with the separate unit in a simple manner for easy servicing or repairing.

An embodiment of the invention wherein between the penetration of the closure needle through the wall of the hot channel structure and the operating element an annular groove is provided which extends around the closure needle behind the seal and which communicate with a leakage channel is particularly advantageous. In this way, a sealing defect at the penetration of the closure needle through the wall of the hot channel structure can be easily detected. When the seal becomes defective, the melt flows into the annular groove and then into the leakage channel. If the end of the leakage channel remote from the annular groove is accessible or visible from without, the presence of any melt that has entered the leakage channel indicates a defect of the penetration seal and corresponding measures for eliminating the defect can be initiated. Since a defect can be readily recognized, the defect can generally be repaired before excessive damages are incurred.

The invention will become more readily apparent from the following description of a particular embodiment thereof described below with reference to the accompanying drawings.

DESCRIPTION OF PARTICULAR EMBODIMENTS

Figure 1:
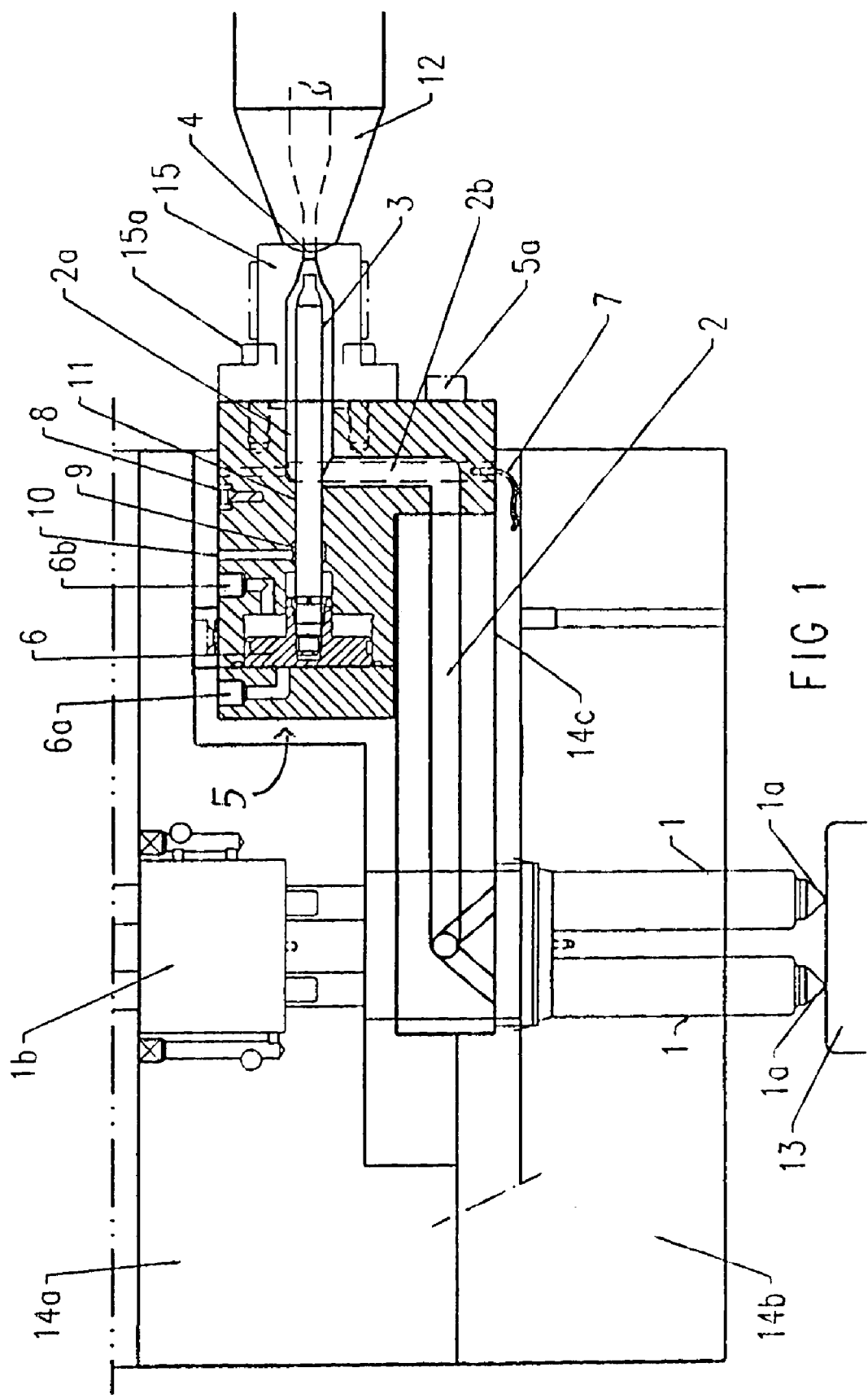
FIG. 1 shows a schematic arrangement of an injection molding tool according to the invention in a sectional view and including a the separate unit in a first position.

As shown particularly in FIG. 1, an injection molding tool includes a tool mounting plate 14a and a tool hot channel plate 14b. Embodiments with additional intermediate plates are also possible. The tool hot channel plate 14b includes hot channel nozzles 1, which are disposed with their nozzle openings 1a on openings of a cavity to be filled with a melt. At their ends opposite the nozzle openings 1a, the hot channel nozzles 1 are connected to a hot channel 2 by way of which melt is conducted to the hot channel nozzles.

The hot channel 2 extends to a girder 14c in the form of a hot channel distributor and is connected at its end remote from the hot channel nozzles 1 to the melt supply nozzle 12 of an injection molding machine. By way of the supply nozzle 12 of the injection molding apparatus melt can be supplied to the hot channel 2.

The hot channel 2 includes at its end adjacent the supply nozzle 12 of the injection molding apparatus, a supply opening 4 by which one of the closure elements in the form of a valve needle 3 can be closed. The closure valve needle 3 extends axially through an inlet part 2a of the hot channel which is disposed adjacent the supply opening 4. At the end of the inlet part 2a remote from the supply opening 4, the hot channel is angled. At the angled end of the inlet part 2a of the hot channel 2, an auxiliary part 2b is provided, whose end remote from inlet part 2a is also angled. In this way, the hot channel 2 has a Z-configuration at its end remote from the injection nozzles 1. In the elbow formed by the angled end of the inlet part 2a of the hot channel 2, the closure needle 3 extends through the wall of the hot channel 2.

The horizontally extending part 2a and the auxiliary part 2b of the hot channel 2 are arranged in a separate unit 5 which is mounted to the guide 14c by mounting bolts 5a so as to be removable from the guide 14c. At its end facing the melt supply nozzle 12 of the injection molding apparatus, the inlet part 2a of the hot channel structure 2 extends through a sprue bushing 15 which is removably mounted to the separate unit 5 by mounting bolts 15a. The sprue bushing 15 could be mounted to the guide 14c instead of the separate unit 5. That is, the separate unit 5 is formed in the area of the hot channel 2 like the sprue bushing 15.

At the place where the valve needle 3 extends through the wall of the hot channel structure 2, the separate unit 5 has a bore receiving the valve needle 3. Additionally, sealing elements 11 in the form of viscous seals are disposed in annular groove. At the side facing away from the penetration area, an annular groove 9 is formed adjacent the seal elements 11 which extends around the valve needle 3.

In communication with the annular groove 9 is a leakage channel in the form of a bore 10 whereby the annular groove has a communication path to the outside.

At its end remote from the inlet opening 4, the valve needle 3 is connected to an operating element 6 in the form of a pneumatic cylinder. If compressed air is supplied to a first connection 6d of the pneumatic cylinder 6, the valve needle is moved axially toward the inlet opening 4 and closes the inlet opening. If compressed air is applied to a second connection 6b of the pneumatic cylinder 6, the valve needle 3 is moved away from the inlet opening and the inlet opening 4 is opened.

The separate unit 5 includes a healing element 7 for heating the separate unit 5 and also a temperature sensor 8.

For servicing or repairing the elements for closing the inlet opening 4, the separate unit 5 can be removed by removing the mounting screws 5a. It may then be replaced by a spare separate unit 5 so that an injection molding apparatus can be operated with only short interruptions if one of the elements of the separate unit should fail. There is hardly any downtime.

If the seal of the penetration opening for example fails in time by wear, melt flows into the annular groove 9 and raises in the leakage bores 10. If melt flows out of the leakage bores 10, this indicates that the penetration seal has worn and servicing or repair work is needed before greater problems occur.

Figure 2:
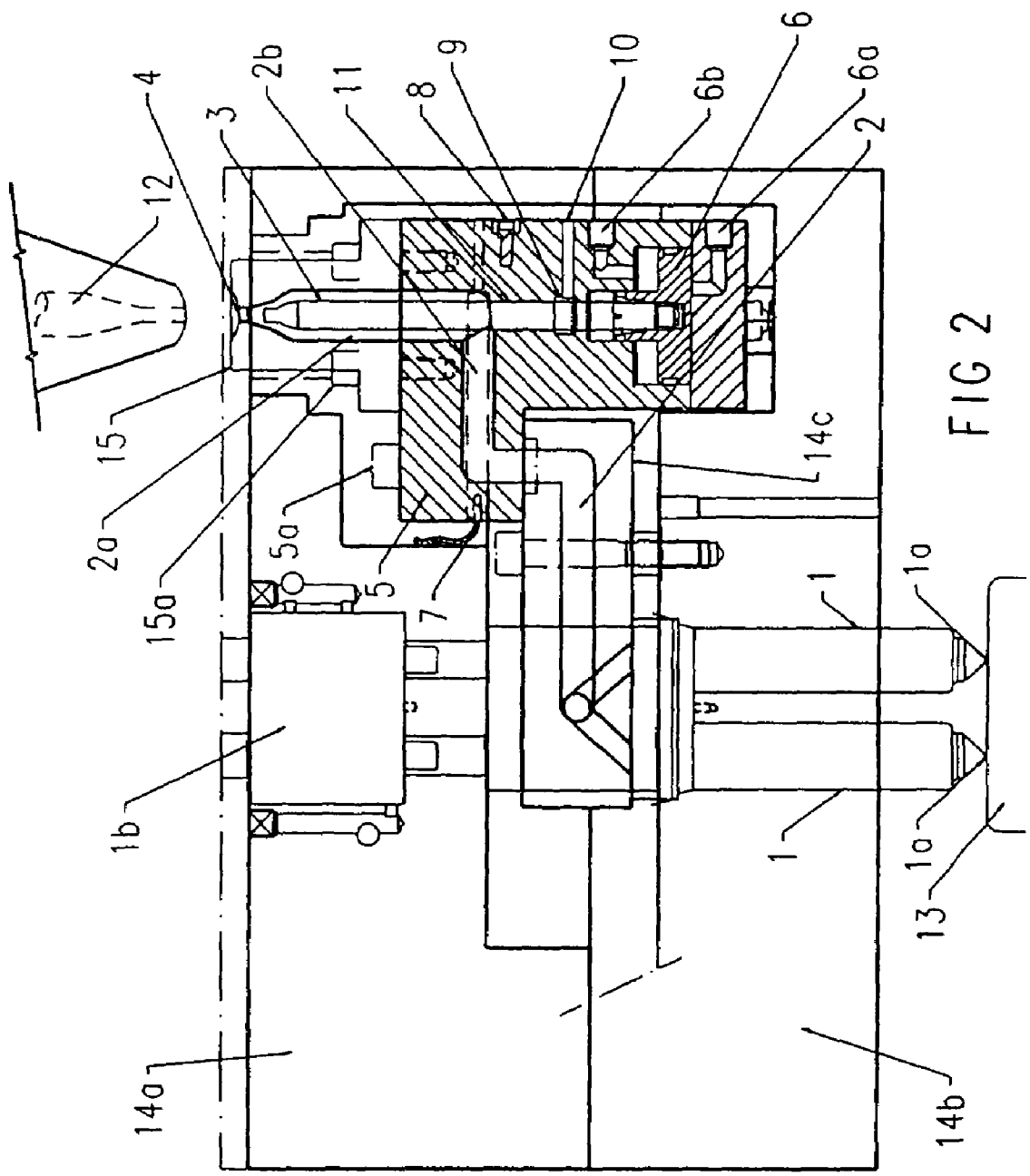
FIG. 2 shows schematically in a sectional view, an injection molding tool with a separate unit arranged in a second position.

The arrangement shown in FIG. 2 corresponds essentially to that of FIG. 1. The same elements are therefore designated by the same reference numerals.

In contrast to the arrangement shown in FIG. 1, however, the separate element 5 is arranged in different positions in the injection molding apparatus.

What is claimed is:

1. An injection molding tool including a hot channel structure (2) for supplying a melt of plastic material to a mold (13), at least one hot channel nozzle (1) in communication with the hot channel structure for receiving melt material therefrom, said hot channel structure (2) having at its end remote from the hot channel nozzle (1) an inlet opening (4) for the supply of the melt, a closure element (3) supported in an inlet area (2a) of the hot channel structure (2) so as to be axially movable toward and away from the inlet opening (4) for closing and opening the hot channel structure (2), said hot channel structure (2) being angled and opposite the inlet opening (4) and having an opening through which the closure element (3) extends from the hot channel structure (2) and an operating element (6) connected to the end of the closure element (3) for actuating the closure element (3), said inlet area (2a) of the hot channel structure (2, 2a, 2b) being disposed in the section of the molding tool which is adjacent the inlet opening (4), said inlet area (2a) and said operating element (6) for actuating the closure element (3) being arranged in a separate unit (5) which is removably connected to the injection molding tool.

2. An injection molding tool according to claim 1, wherein at the angled end of the inlet area (2a) of the hot channel structure (2) an addition (2b) is provided having an angled section at its end remote from the inlet area (2a).

3. An injection molding tool according to claim 1, wherein the separate unit (5) includes a heating element (7).

4. An injection molding tool according to claim 1, wherein said separate unit (5) includes a temperature sensor (8).

5. An injection molding tool according to claim 1, wherein between the penetration of the closure element (3) through the wall of the hot channel structure (2) and the operating element (6) an annular groove (9) is provided so as to extend around the closure element (3) and a leakage channel (10) extends from the annular groove (9) through the separate unit (12).

* * * * *

UNITED STATES PATENT AND TRADEMARK OFFICE
CERTIFICATE OF CORRECTION

PATENT NO. : 7,377,770 B2 Page 1 of 1
APPLICATION NO. : 11/254504
DATED : May 27, 2008
INVENTOR(S) : Gerd Würstlin It is certified that error appears in the above-identified patent and that said Letters Patent is hereby corrected as shown below:

Title page, item [30] foreign application priority should be (DE) – Germany.

Signed and Sealed this

Twenty-ninth Day of July, 2008

JON W. DUDAS
*Director of the United States Patent and Trademark Office*